United States Patent
Koganezawa

(10) Patent No.: US 10,088,160 B2
(45) Date of Patent: Oct. 2, 2018

(54) GAS TURBINE COMBUSTOR AND STEAM INJECTED GAS TURBINE

(71) Applicant: Mitsubishi Hitachi Power Systems, Ltd., Nishi-ku, Yokohama (JP)

(72) Inventor: Tomomi Koganezawa, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 289 days.

(21) Appl. No.: 15/015,843

(22) Filed: Feb. 4, 2016

(65) Prior Publication Data

US 2016/0230995 A1 Aug. 11, 2016

(30) Foreign Application Priority Data

Feb. 6, 2015 (JP) .................................. 2015-022315

(51) Int. Cl.
*F23R 3/04* (2006.01)
*F23R 3/00* (2006.01)
(Continued)

(52) U.S. Cl.
CPC ................ *F23R 3/002* (2013.01); *F02C 3/30* (2013.01); *F02C 3/305* (2013.01); *F23L 7/005* (2013.01);
(Continued)

(58) Field of Classification Search
CPC .. F23R 3/002; F23R 3/045; F23R 3/04; F23R 3/06; F02C 3/30; F02C 3/305; F23L 2900/07009
See application file for complete search history.

(56) References Cited

U.S. PATENT DOCUMENTS 3,747,336 A 7/1973 Dibelius et al.
3,785,146 A 1/1974 Bailey et al.
(Continued)

FOREIGN PATENT DOCUMENTS

| CH | 707 748 A2 | 9/2014 |
|---|---|---|
| EP | 2 778 354 A1 | 9/2014 |
| JP | 4-25967 U | 3/1992 |

OTHER PUBLICATIONS

European Search Report issued in counterpart European Application No. 16154409.3 dated Jun. 8, 2016 (eight pages).

*Primary Examiner* — Steven Sutherland
(74) *Attorney, Agent, or Firm* — Crowell & Moring LLP

(57) ABSTRACT

A gas turbine combustor includes a tubular combustion liner that has a plurality of dilution holes disposed circumferentially at a section downstream in a direction of flow of combustion gas, a combustor casing that encloses the combustion liner, a liner flow sleeve disposed between the combustion liner and the combustor casing, to define with the combustion liner an air flow path through which compressed air flows, the liner flow sleeve having a plurality of steam injection holes, and a steam distribution mechanism disposed on an outer peripheral side of the liner flow sleeve. The steam distribution mechanism distributes received injection steam to the steam injection holes. At least some of the steam injection holes are disposed so to face at least some of the dilution holes. The steam injection holes facing the respective dilution holes are each formed so as to spurt the injection steam toward the corresponding dilution hole.

9 Claims, 9 Drawing Sheets

(51) Int. Cl.
  *F02C 3/30* (2006.01)
  *F23R 3/06* (2006.01)
  *F23L 7/00* (2006.01)
(52) U.S. Cl.
  CPC ............... *F23R 3/04* (2013.01); *F23R 3/045* (2013.01); *F23R 3/06* (2013.01); *F23L 2900/07009* (2013.01)

(56) References Cited

U.S. PATENT DOCUMENTS

| | | | | |
|---|---|---|---|---|
| 4,819,438 | A | * | 4/1989 | Schultz .................... F23M 5/08 165/156 |
| 5,054,279 | A | | 10/1991 | Hines |
| 5,285,628 | A | * | 2/1994 | Korenberg .............. F23C 3/006 60/39.55 |
| 2001/0049932 | A1 | * | 12/2001 | Beebe ...................... F23L 7/00 60/776 |
| 2003/0150216 | A1 | * | 8/2003 | O'Beck ..................... F02C 3/30 60/775 |
| 2012/0031103 | A1 | * | 2/2012 | Abe .......................... F02C 6/18 60/776 |
| 2014/0123668 | A1 | | 5/2014 | Huntington et al. |
| 2014/0137564 | A1 | * | 5/2014 | Scipio ....................... F02C 3/30 60/775 |
| 2014/0260261 | A1 | | 9/2014 | Romoser et al. |

* cited by examiner

GAS TURBINE COMBUSTOR AND STEAM INJECTED GAS TURBINE

BACKGROUND OF THE INVENTION

1. Field of the Invention

The present invention relates generally to gas turbine combustors into which steam is injected and steam injected gas turbines including the gas turbine combustors. More particularly, the present invention relates to a gas turbine combustor and a steam injected gas turbine including the gas turbine combustor that can be applied to a variable heat to power cogeneration system that varies an amount of injection steam to thereby change an output ratio of heat (steam) and power.

2. Description of Related Art

The variable heat to power cogeneration system injects part of steam (heat) generated by exhaust heat of a gas turbine into a gas turbine combustor to thereby increase power generation and improve thermal efficiency. By varying the amount of injection steam for the gas turbine combustor, the variable heat to power cogeneration system can change a ratio of steam (heat) and power. The system can change the heat to power ratio according to the ratio of heat demand to power demand and is greatly expected as a high efficiency dispersed power source with low energy loss.

JP-UM-A-4-25967 discloses a gas turbine combustor into which steam is injected, such as the gas turbine combustor in the variable heat to power cogeneration system. The gas turbine combustor includes two types of steam jet nozzles in order to maintain stable combustion and to reduce nitrogen oxide (NOx) even with a large amount of steam supplied, specifically, a multihole inside-combustor-casing steam jet nozzle and a dilution-zone steam jet nozzle. The inside-combustor-casing steam jet nozzle supplies steam into an air flow path having an annular cross section formed between a combustion liner and a combustor casing. The dilution-zone steam jet nozzle supplies steam directly into a dilution zone inside the combustor from part of dilution air holes formed in the combustion liner.

SUMMARY OF THE INVENTION

Mixing steam with air (combustion air) achieves an effect of reduction in NOx discharged from the combustor. If the steam is unevenly mixed with the air, however, a greater amount of NOx tends to be generated from a zone having a low humidity level and a desired NOx reduction effect may not be achieved. In a zone having an excessively high humidity level, combustion efficiency may be reduced due to degraded flame stability, such as flame extinction; in addition, the combustion liner, transition duct, turbine, and other parts that are subject to high temperatures can undergo large thermal stress, resulting in reduced service lives. Uniform Mixing of steam with air is thus required in order to achieve both the NOx reduction and stable combustion. In a configuration of the gas turbine combustor disclosed in JP-UM-A-4-25967, in which steam is supplied into the air flow path having the annular cross section from the inside-combustor-casing steam jet nozzle that has a plurality of holes disposed in a circumferential direction, adjusting the number of the holes of the steam jet nozzle enables uniform mixing of steam with air.

Achieving both the NOx reduction and stable combustion is also required even when a large amount of steam is injected resulting in 25 vol % or more of humidity contained in the air that flows through the combustor. A method is thus conceivable to both achieve NOx reduction by spurting part of the steam into the air flow path and avoid fire extinction (maintain stable combustion) by spurting a remaining excess steam directly into the combustion chamber, as in the gas turbine combustor disclosed in JP-UM-A-4-25967.

The gas turbine combustor that is subjected to varying amounts of injection steam, such as the gas turbine combustor in the variable heat to power cogeneration system that varies the amount of steam to be injected into the combustor to thereby change the output ratio of heat (steam) to power, is required to achieve both NOx reduction and maintenance of stable combustion irrespective of the amount of the injection steam. To apply the gas turbine combustor disclosed in JP-UM-A-4-25967 to the variable heat to power cogeneration system, it is required to perform steam flow rate control to increase an injection amount of the inside-combustor-casing steam jet nozzle than an injection amount of the dilution-zone steam jet nozzle in order to achieve NOx reduction when the amount of injection steam for the gas turbine combustor is small with a heavy heat demand. In contrast, when the amount of injection steam is large with a heavy power demand, it is required to perform the steam flow rate control to increase the injection amount of the dilution-zone steam jet nozzle than the injection amount of the inside-combustor-casing steam jet nozzle in order to avoid fire extinction (to maintain stable combustion). Specifically, it is considered that it is necessary to provide two systems of steam, one for steam to be spurted from the inside-combustor-casing steam jet nozzle and the other for steam to be spurted from the dilution-zone steam jet nozzle, and to perform complicated control to regulate the flow rate of the two systems separately.

The present invention has been made to solve the foregoing problem and it is an object of the present invention to provide a gas turbine combustor and a steam injected gas turbine that can achieve both NOx reduction and stable combustion without the need to perform complicated control with respect to the varying injection steam amounts.

To solve the foregoing problem, the present invention incorporates configurations as defined in the appended claims. This application includes a plurality of means for solving the foregoing problem. In one aspect, the present invention provides a gas turbine combustor into which steam with a variable flow rate is injected and which burns fuel with compressed air from a compressor to generate combustion gas. The gas turbine combustor includes: a tubular combustion liner that defines therein a combustion chamber and that has a plurality of dilution holes disposed at circumferentially spaced intervals at a section downstream in a direction of flow of the combustion gas; a combustor casing that encloses the combustion liner; a liner flow sleeve that is disposed between the combustion liner and the combustor casing to define with the combustion liner an annular air flow path through which the compressed air flows and that has a plurality of steam injection holes; and a steam distribution mechanism that is disposed on an outer peripheral side of the liner flow sleeve and that receives the injected steam and distributes the received steam to the steam injection holes. In the gas turbine combustor, at least some of the steam injection holes are disposed so as to face at least some of the dilution holes, and the steam injection holes facing the respective dilution holes are each formed so as to spurt the steam toward the corresponding dilution hole that faces the steam injection hole.

Effect of the Invention

In the aspect of the present invention, the injected steam is spurted into the flow of the compressed air through the air flow path, from the steam injection holes toward the dilution holes facing the respective steam injection holes. Thus, a ratio of steam to be mixed with the compressed air for use in combustion to steam to flow through the dilution holes varies appropriately according to an injection steam amount. Specifically, both NOx reduction and stable combustion can be achieved with respect to the varying injection steam amounts without the need to perform complicated control.

Problems, configurations, and effects other than those described above will be readily understood by the following detailed description of embodiments in conjunction with the accompanying drawings.

DESCRIPTION OF THE PREFERRED EMBODIMENTS

A gas turbine combustor and a steam injected gas turbine according to preferred embodiments of the present invention will be described below with reference to the accompanying drawings.

First Embodiment

Figure 1:
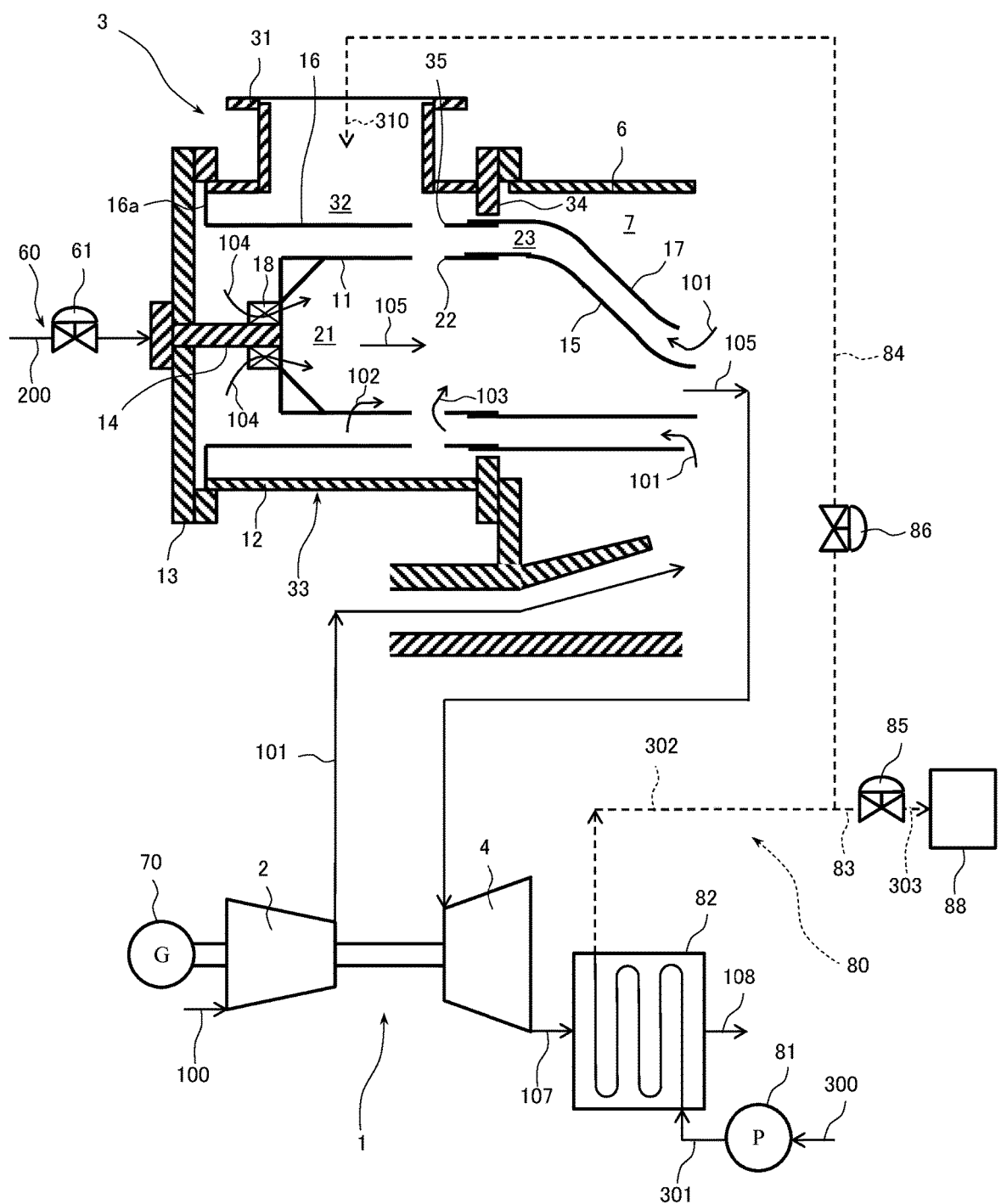
FIG. 1 is a longitudinal cross-sectional view of a gas turbine combustor according to a first embodiment of the present invention and a system flow diagram of a variable heat to power cogeneration system including the gas turbine combustor.

Configurations of a gas turbine combustor and a steam injected gas turbine according to a first embodiment of the present invention and a variable heat to power cogeneration system including the same will be described below with reference to FIG. 1. FIG. 1 is a longitudinal cross-sectional view of the gas turbine combustor according to the first embodiment of the present invention and a system flow diagram of a variable heat to power cogeneration system including the gas turbine combustor.

In FIG. 1, the variable heat to power cogeneration system mainly includes a gas turbine 1, a generator 70, and a steam suppler system 80. Specifically, the generator 70 is driven by the gas turbine 1 to thereby generate power. The steam supply system 80 generates steam 302 by recovering heat from exhaust heat of the gas turbine 1 and supplies the steam 302 thus generated to, for example, the gas turbine 1. The gas turbine 1 includes a compressor 2, a plurality of combustors 3, and a turbine 4. Specifically, the compressor 2 compresses air 100 to thereby generate compressed air 101 at high pressure. The combustors 3 each mix the compressed air 101 guided thereinto from the compressor 2 with fuel 200 and burn the compressed air 101 and the fuel 200 to thereby generate combustion gas 105. The turbine 4 receives the combustion gas 105 generated by the combustor 3.

The following describes a detailed configuration of the gas turbine combustor according to the first embodiment of the present invention.

In FIG. 1, the combustor 3 includes a combustion liner 11, a combustor casing 12, a combustor cover 13, a fuel nozzle 14, and a transition duct 15. Specifically, the combustion liner 11 has a tubular shape to form a combustion chamber 21 thereinside. The combustor casing 12 has a tubular shape and encloses the combustion liner 11. The combustor cover 13 closes an opening on one end side (the left side in FIG. 1) in an axial direction of the combustor casing 12. The fuel nozzle 14 is disposed substantially at a center on one end (on the left end in FIG. 1) in an axial direction of the combustion liner 11. The fuel nozzle 14 spurts the fuel 200 into the combustion liner 11. The transition duct 15 has one end portion inserted into the other end portion (the right end portion in FIG. 1) in the axial direction of the combustion liner 11. The transition duct 15 guides the combustion gas 105 generated in the combustion liner 11 into the turbine 4. The combustor casing 12 has the other end side (the right side in FIG. 1) mounted on a turbine casing 6. A space into which the compressed air 101 flows from the compressor 2 is formed inside the turbine casing 6.

A liner flow sleeve 16 having a substantially cylindrical shape is disposed between the combustion liner 11 and the combustor casing 12. The liner flow sleeve 16 has a flange portion 16a fastened to the end portion of the combustor casing 12 on the side of the combustor cover 13 (on the left side in FIG. 1) so as to be substantially coaxial with the combustion liner 11. A tubular transition duct flow sleeve 17 is disposed outside the transition duct 15 with a space therebetween. The transition duct flow sleeve 17 has one end portion (the left end portion in FIG. 1) inserted into a downstream end portion (the right end portion in FIG. 1) of the liner flow sleeve 16. An annular air flow path 23 through which the compressed air 101 flows toward the fuel nozzle 14 is defined between the combustion liner 11 and the liner flow sleeve 16, and between the transition duct 15 and the transition duct flow sleeve 17. In other word, the combustion liner 11 forms, with liner flow sleeve 16, the air flow path 23 and isolates unburned compressed air 101 that has flowed from the compressor 2 from burned combustion gas 105. Similarly, the transition duct 15 forms, with the transition duct flow sleeve 17, the air flow path 23 and isolates the unburned compressed air 101 from the burned combustion gas 105.

A plurality of dilution holes 22 are formed at circumferentially spaced intervals at a section of the combustion liner 11 downstream in a flow direction of the combustion gas 105. The dilution holes 22 function to mix part of the compressed air 101 in the air flow path 23 as dilution air 103 with the combustion gas 105 in the combustion liner 11. A swirler 18 is disposed on an outer peripheral portion of the fuel nozzle 14. The swirler gives compressed air (combustion air 104) that has flowed to the side of the fuel nozzle 14 a swirl component.

A steam injection port 31 is disposed at the combustor casing 12. Steam (injection steam 310) from an injection steam system 84 (to be described later) of the steam supply system 80 is injected into the steam injection port 31. A steam header 33 is disposed on an inner peripheral side of the combustor casing 12. The steam header 33 has an annular space 32 that receives the steam (injection steam 310) from the steam injection port 31. The steam header 33 distributes the injection steam 310 from the steam injection port 31 no a plurality of steam injection holes 35 no be described later. The steam header 33 includes, for example, the combustor casing 12, the liner flow sleeve 16, and an annular bulkhead 34 that protrudes from the end portion of the combustor casing 12 on the side adjacent to the turbine casing 6 (the end portion downstream in the flow direction of the combustion gas 105; the right end portion in FIG. 1) toward the side of the liner flow sleeve 16. The bulkhead 34 separates the space 7 inside the turbine casing 6 from the annular space 32.

The steam injection port 31 and the steam header 33 constitute a steam distribution mechanism that receives the steam (injection steam 310) injected from the injection steam system 84 to be described later) and distributes the received steam to the steam injection holes 35 (to be described later).

The liner flow sleeve 16 has a plurality of steam injection holes 35 disposed at circumferentially spaced intervals. The steam injection holes 35 spurt steam in the steam header 33 into a flow of the compressed air 101 through the air flow path 23. At least some of the steam injection holes 35 are disposed so as to face at least some of the dilution holes 22 of the combustion liner 11. Specifically, all of the steam injection holes 35 may face all of the dilution holes 22 (in which case, the steam injection holes 35 are identical in number to the dilution holes 22), all of the steam injection holes 35 may face some of the dilution holes 22 (in which case, the steam injection holes 35 are smaller in number than the dilution holes 22), some of the steam injection holes 35 may face all of the dilution holes 22 (in which case, the steam injection holes 35 are greater in number than the dilution holes 22), or some of the steam injection holes 35 may face some of the dilution holes 22. A steam injection hole 35 that faces a dilution hole 22 is formed so as to spurt the injection steam 310 toward the dilution hole 22 the specific steam injection hole 35 faces. This structure can be achieved by, for example, setting a hole diameter of the steam injection holes 35 on the basis, for example, of a volume of the annular space 32 of the steam header 33. It is noted that, in this specification, when a steam injection hole 35 faces a dilution hole 22, that specific steam injection hole 35 may be slightly misaligned with respect to the mating dilution hole 22 as long as the steam injection hole 35 can spurt steam into the mating dilution hole 22.

The combustor 3 is connected to a fuel system 60 that supplies the combustor 3 with the fuel 200. The fuel system 60 includes a fuel flow rate control valve 61. Varying a valve position of the fuel flow rate control valve 61 to adjust a fuel flow rate allows a power output of the gas turbine 1 to be adjusted.

The following describes a configuration of the steam supply system 80 with reference to FIG. 1.

In FIG. 1, the steam supply system 80 includes a pump 81, an exhaust heat recovery steam generator 82, a process steam system 83, and the injection steam system 84. Specifically, the pump 81 pressurizes boiler water 300 and delivers high pressure water 301. The exhaust heat recovery steam generator 82 subjects the high pressure water 301 sent under pressure from the pump 81 to heat exchange with the exhaust heat from the gas turbine 1 to thereby generate the steam 302. The process steam system 83 supplies, as process steam 303, the steam 302 generated by the exhaust heat recovery steam generator 82 to steam consumption equipment 88. Examples of the steam consumption equipment 88 include, but are not limited to, a plant that represents a facility requiring a heat source. The injection steam system 84 injects the steam 302 generated by the exhaust heat recovery steam generator 82 into the combustor 3.

The process steam system 83 includes a line and a process steam flow rate control valve 85 disposed in the line. The process steam flow rate control valve 85 controls a supply steam flow rate to the steam consumption equipment 88. The injection steam system 84 includes a line that has one end connected to the steam injection port 31 and the other end branching from the line of the process steam system 83. A steam flow rate control valve 86 is disposed in the line of the injection steam system 84. The steam flow rate control valve 86 can vary flow rate of the steam to the combustor 3.

When a steam amount generated by the exhaust heat recovery steam generator 82 exceeds a steam amount required by the steam consumption equipment 88, the variable heat to power cogeneration system having the configurations as described above can inject an excess of the steam 302 into the combustor 3 to thereby increase the output of the generator 70, thereby varying the heat to power ratio.

The following describes, with reference to FIG. 1, a flow of a working fluid including the injection steam in the gas turbine combustor and the steam injected gas turbine according to the first embodiment of the present invention.

Reference is made to FIG. 1. The compressed air 101 under high pressure delivered from the compressor 2 flows from the space 7 inside the turbine casing 6 into the air flow path 23 between the transition duct 15 and the transition duct flow sleeve 17 via an opening on the side of the turbine 4 (downstream in the flow direction of the combustion gas). The compressed air 101, while flowing toward the side of the combustion liner 11 (upstream in the flow direction of the combustion gas), cools the transition duct 15 from outside. Thereafter, the compressed air 101 flows through the air flow path 23 between the combustion liner 11 and the liner flow sleeve 16 toward the side of the fuel nozzle 14. During this time, the compressed air 101 cools the combustion liner 11 from outside.

Part of the compressed air 101 flows as cooling air 102 into an inside of the combustion liner 11 through cooling holes (not shown) formed in the combustion liner 11, to thereby serve for film cooling. Another part of the compressed air 101 flows as the dilution air 103 into the inside of the combustion liner 11 through the dilution holes 22 of the combustion liner 11 and is mixed with the combustion gas 105 to be described later before flowing into the transition duct 15.

A remainder of the compressed air 101 flows as the combustion air 104 into the inside of the combustion liner 11 from the swirler 18 disposed on the outer periphery of the fuel nozzle 14 and is used with the fuel 200 spurted out from the fuel nozzle 14 for combustion to thereby become the combustion gas 105 at high temperature. The combustion gas 105 at high temperature is mixed with the cooling air 102 and the dilution air 103 to thereby be cooled before being sent to the turbine 4. The combustion gas 105 that has flowed into the turbine 4 rotatably dries the turbine 4 to become low pressure gas. Low pressure turbine exhaust gas 107 from the turbine 4 undergoes heat recovery by the exhaust heat recovery steam generator 82 before being discharged as exhaust gas 108 into the atmosphere.

In the exhaust heat recovery steam generator 82, the steam 302 is generated by heat of the turbine exhaust. Gas 107. Part of this steam 302 is injected as the injection steam 310 into the combustor 3 via the injection steam system 84 after the flow rate of the injection steam 310 is varied as necessary by the steam flow rate control valve 86. The injection steam 310 flows into the steam header 33 via the steam injection port 31 to thereby flow circumferentially across the annular space 32. The injection steam 310 through the annular space 32 flows into the air flow path 23 between the combustion liner 11 and the liner flow sleeve 16 from the steam injection holes 35. The foregoing operation promotes making humidity uniform circumferentially throughout the combustor 3 even with a single steam injection port 31 for a single combustor casting 12. In addition, the steam header 33 is isolated from the space 7 inside the turbine casing 6 by the bulkhead 34. This configuration prevents the injection steam 310 in the steam header 33 from being mixed with the compressed air 101 in the turbine casing 6.

The following describes, with reference to FIGS. 2 to 7, a flow of the working fluid including the injection steam in an area near the dilution hole in the gas turbine combustor and the steam injected gas turbine according to the first embodiment of the present invention.

The flow of the working fluid in the area near the dilution hole when steam is not injected will first be described below with reference to FIGS. 2 and 3. This situation corresponds to a case in which the steam consumption equipment 88 (see FIG. 1) has high steam consumption. The flow corresponds to a flow in a simple cogeneration system with no steam injection. The flow also corresponds to a flow in a simple cycle when considered from a standpoint of the gas turbine.

Figure 2:
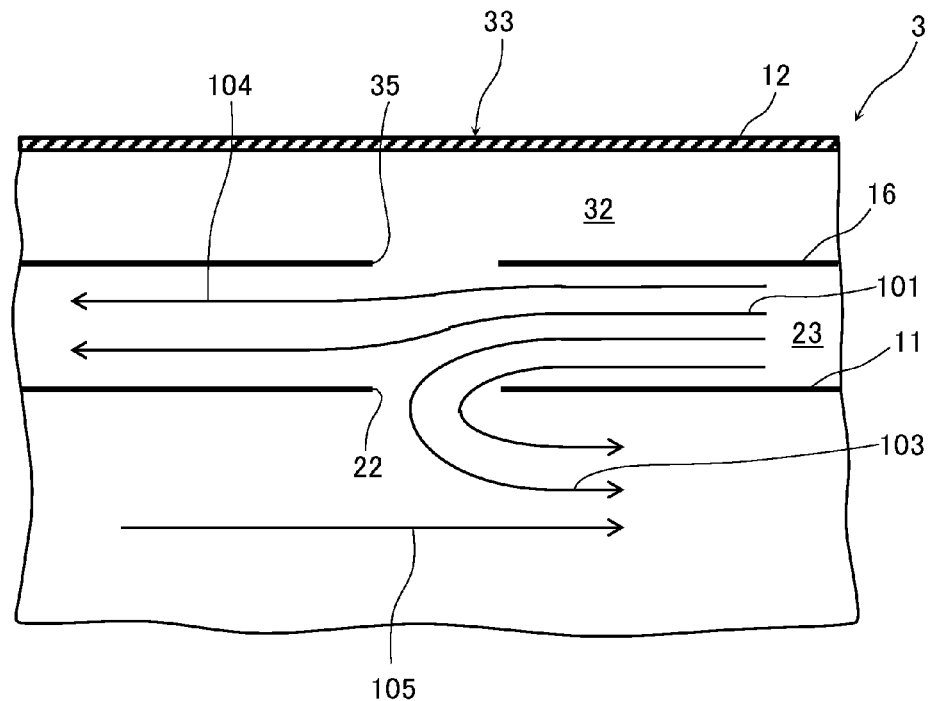
FIG. 2 is a schematic view illustrating a flow of a working fluid in an area near a dilution hole with no injection steam in the gas turbine combustor and the steam injected gas turbine according to the first embodiment of the present invention shown in FIG. 1.

FIG. 2 is a schematic view illustrating the flow of the working fluid in the area near the dilution hole with no injection steam in the gas turbine combustor and the steam injected gas turbine according to the first embodiment of the present invention shown in FIG. 1. FIG. 3 is a schematic view illustrating the flow of the working fluid in the area near the dilution hole with no injection steam shown in FIG. 2, as viewed from an outer peripheral side of the combustion liner. In FIGS. 2 and 3, the same elements as used in FIG. 1 are each identified by the same reference number and detailed description of these elements is therefore omitted herein.

Figure 3:
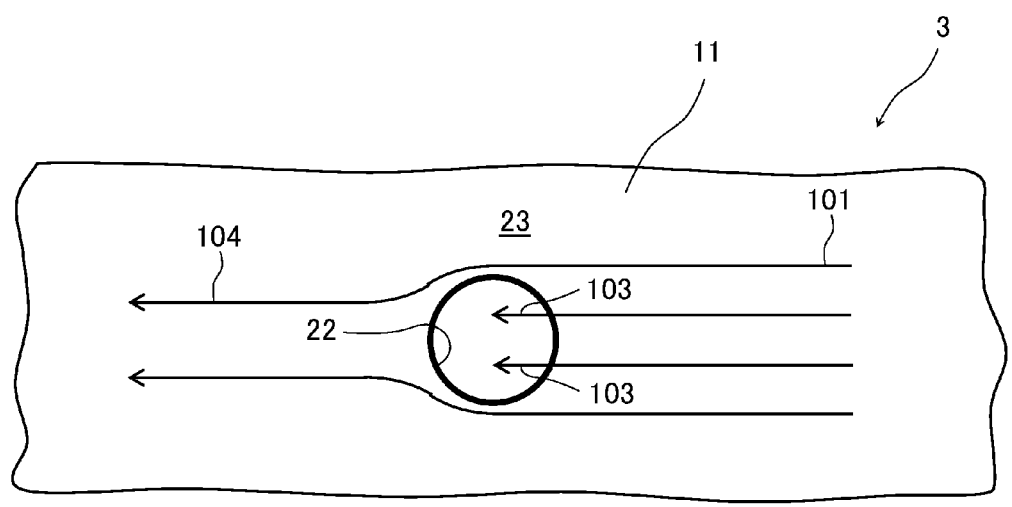
FIG. 3 is a schematic view illustrating the flow of the working fluid in the area near the dilution hole with no injection steam shown in FIG. 2, as viewed from an outer peripheral side of a combustion liner.

As shown in FIGS. 2 and 3, the compressed air 101 flows from the right to the left (from the side of the transition duct 15 toward the side of the fuel nozzle 14 shown in FIG. 1) in the air flow path 23 between the combustion liner 11 and the liner flow sleeve 16. Part of the compressed air 101 flows as the dilution air 103 into the inside of the combustion liner 11 through the dilution hole 22 and is thereafter mixed with the combustion gas 105. The remainder of the compressed air 101 flows as the combustion air 104 to the left of the combustion liner 11 (toward the side of the fuel nozzle 14 shown in FIG. 1).

The foregoing flow of the working fluid allows the flow rate of the combustion air 104 to be set to a level that is required and sufficient for NOx reduction as in an ordinary simple cycle. In addition, combustion stability can be achieved by causing the excess air that adversely affects combustion stability not to flow toward the side of the fuel nozzle 14, but to flow as the dilution air 103. Moreover, agitation and dilution of the combustion gas 105 by the flow of the dilution air 103 achieves a uniform temperature distribution at an inlet of the turbine 4 (see FIG. 1.), thereby contributing to achieving required service lives of parts subject to high temperatures.

The flow of the working fluid in the area near the dilution hole when the injection steam has a relatively low flow rate will be described below with reference to FIGS. 4 and 5 The flow corresponds to a flow of an ordinary steam injected system.

Figure 4:
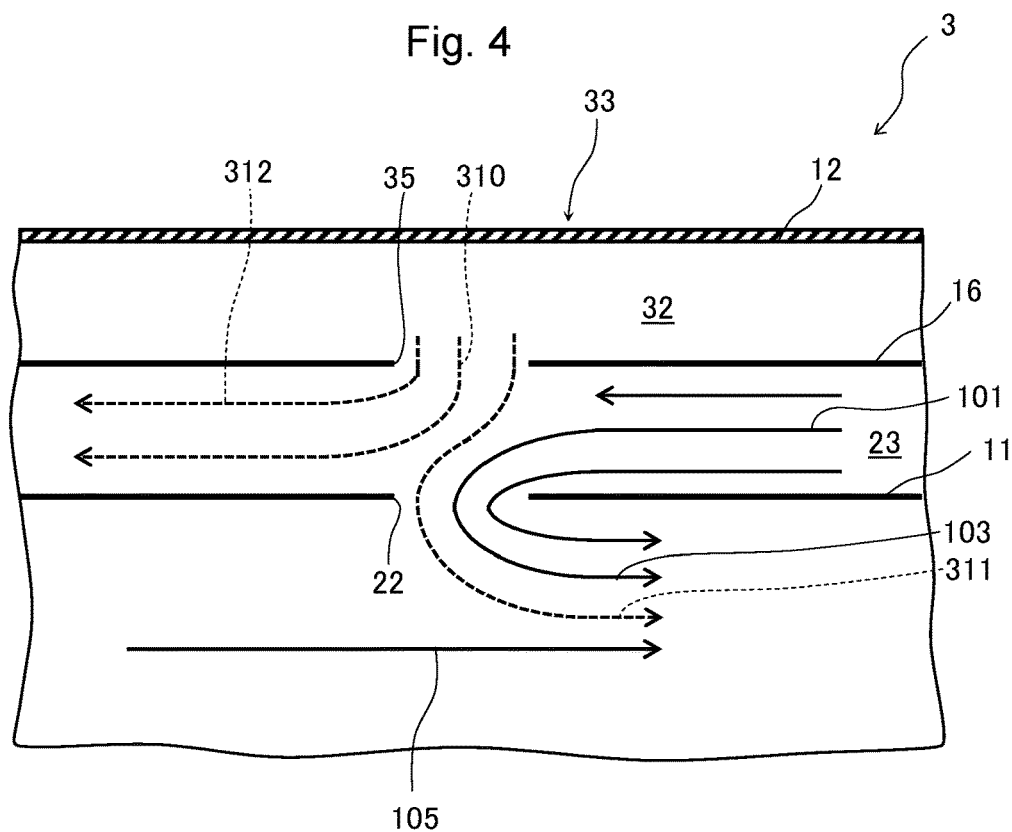
FIG. 4 is a schematic view illustrating a flow of the working fluid including injection steam in the area near the dilution hole when the injection steam has a relatively low flow rate in the gas turbine combustor and the steam injected gas turbine according to the first embodiment of the present invention shown in FIG. 1.

FIG. 4 is a schematic view illustrating the flow of the working fluid including the injection steam in the area near the dilution hole when the injection steam has a relatively low flow rate in the gas turbine combustor and the steam injected gas turbine according to the first embodiment of the present invention shown in FIG. 1. FIG. 5 is a schematic view illustrating the flow of the working fluid including the injection steam in the area near the dilution hole when the injection steam has a relatively low flow rate shown in FIG. 4, as viewed from the outer peripheral side of the combustion liner. In FIGS. 4 and 5, the same elements as used in FIGS. 1 to 3 are each identified by the same reference number and detailed description of these elements is therefore omitted herein.

Figure 5:
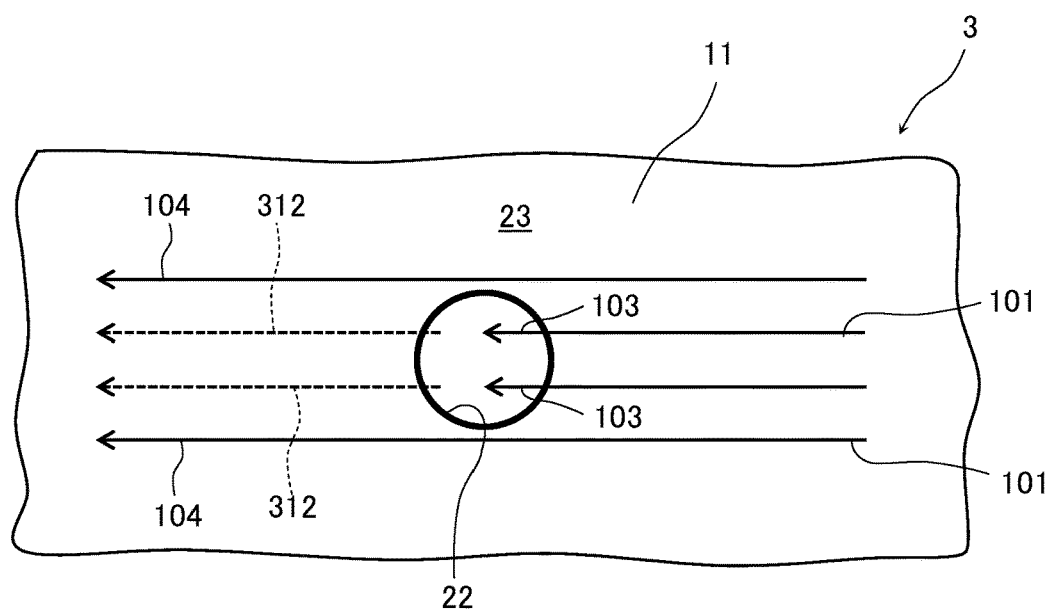
FIG. 5 is a schematic view illustrating the flow of the working fluid including the injection steam in the area near the dilution hole when the injection steam has a relatively low flow rate shown FIG. 4, as viewed from the outer peripheral side of the combustion liner.

As shown in FIGS. 4 and 5, the injection steam 310 through the annular space 32 of the steam header 33 is spurted out from a steam injection hole 35 of the liner flow sleeve 16 toward the dilution hole 22 that faces the steam injection hole 35 substantially orthogonally relative to the flow of the compressed air 101 through the air flow path 23. In this case, the injection steam 310 has a low flow rate and thus has a low injection velocity.

As a result, most of the spurted injection steam 310 is bent by the flow of the compressed air 101 at high speed toward a flow direction of the compressed air 101 (to the left in FIGS. 4 and 5) from a radially inward direction (a downward direction in FIG. 4; a downward direction of a direction orthogonal to the drawing of FIG. 5) and flows with the combustion air 104 to the left (to the side of the fuel nozzle 14 shown in FIG. 1) as NOx reduction steam 312. The NOx reduction steam 312 and the combustion air 104 are mixed with each other as they flow to the left to become high humidity air. The high humidity air is used for combustion, so that an effect of NOx reduction can be achieved.

Meanwhile, only a remainder of the injection steam 310 penetrates the flow of the compressed air 101 and flows as dilution steam 311, from the dilution hole 22 that faces the steam injection hole 35, together with the dilution air 103 into the inside of the combustion liner 11. Combustion stability can be achieved by causing the excess steam to serve as the dilution steam 311. Moreover, agitating and diluting the combustion gas 105 using the flow of the dilution steam 311 achieves a uniform temperature distribution at the inlet of the turbine 4 (see FIG. 1), thereby contributing to achieving required service lives of parts subject to high temperatures.

When the steam injection holes 35 that do not face any dilution hole 22 are included, steam spurted out from these steam injection holes 35 that do not face any dilution hole 22 is totally mixed as the NOx reduction steam 312 with the combustion air 104. This configuration is used when a minimum essential amount of steam required for NOx reduction needs to be obtained.

The flow of the working fluid in the area near the dilution hole when the injection steam has a relatively high flow rate will be described below with reference to FIGS. 6 and 7. This situation corresponds to a case in which a power demand is greater than a heat demand in a steam injected system having a large heat to power variation range.

Figure 6:
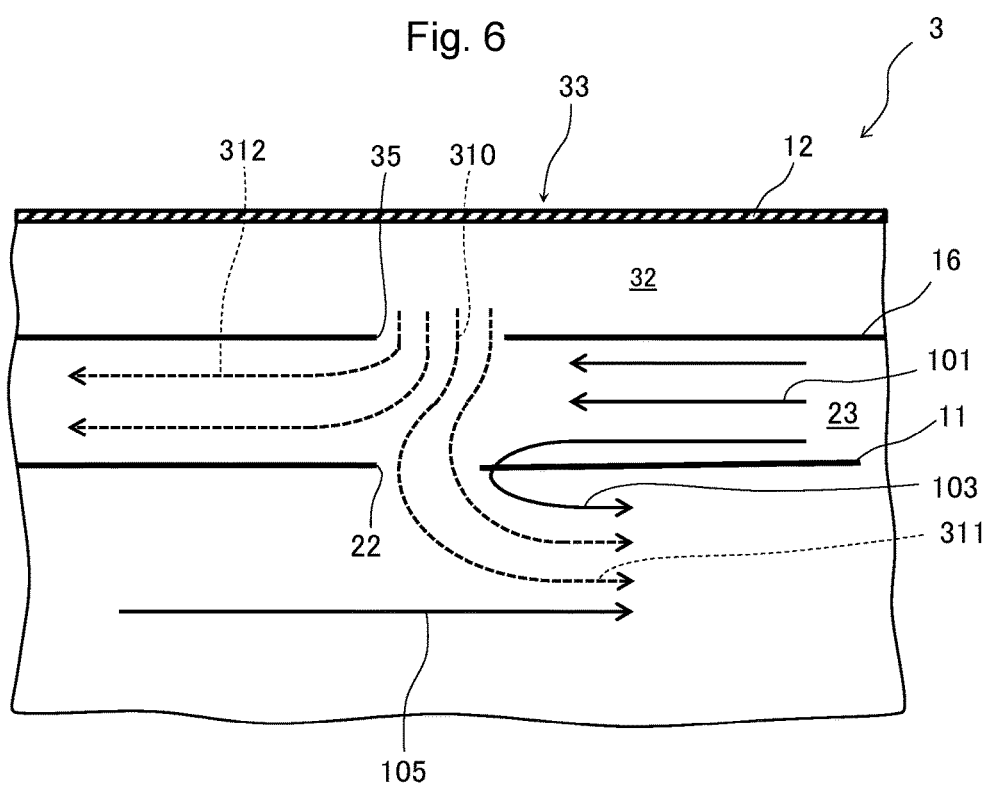
FIG. 6 is a schematic view illustrating a flow of the working fluid including the injection steam in the area near the dilution hole when the injection steam has a relatively high flow rate in the gas turbine combustor and the steam injected gas turbine according to the first embodiment of the present invention shown in FIG. 1.

FIG. 6 is a schematic view illustrating the flow of the working fluid including the injection steam in the area near the dilution hole when the injection steam has a relatively high flow rate in the gas turbine combustor and the steam injected gas turbine according to the first embodiment of the present invention shown in FIG. 1. FIG. 7 is a schematic view illustrating the flow of the working fluid including the injection steam in the area near the dilution hole when the injection steam has a relatively high flow rate shown in FIG. 6, as viewed from the outer peripheral side of the combustion liner. In FIGS. 6 and 7, the same elements as used in FIGS. 1 to 5 are each identified by the same reference number and detailed description of these elements is therefore omitted herein.

Figure 7:
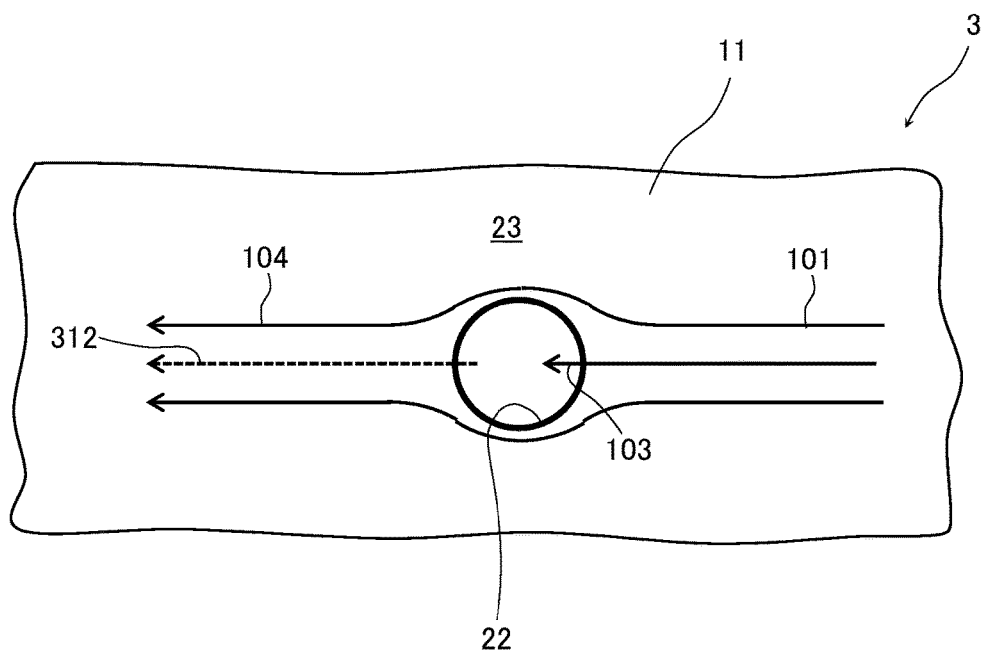
FIG. 7 is a schematic view illustrating the flow of the working fluid including the injection steam in the area near the dilution hole when the injection steam has a relatively high flow rate shown in FIG. 6, as viewed from the outer peripheral side of the combustion liner.

As shown in FIGS. 6 and 7, the injection steam 310 in the annular space 32 is spurted out from the steam injection hole 35 toward the dilution hole 22 substantially orthogonally relative to the flow of the compressed air 101 through the air flow path 23, as in the case in which the injection steam has a relatively low flow rate (see FIGS. 4 and 5).

In this case, the injection steam 310, because of its high flow rate and high injection velocity involved, carries a large force to penetrate the flow of the compressed air 101 as compared with the case in which the injection steam 310 has a low flow rate, a good part of the injection steam 310 flows through the dilution hole 22 to become the dilution steam 311. Meanwhile, only a remainder of the injection steam 310 is pulled by the flow of the compressed air 101 existing around the injection steam 310 and mixed as the NOx reduction steam 312 with the combustion air 104 for use in combustion. This allows the effect of NOx reduction thanks to the humidity in the steam to be maintained. Meanwhile, combustion stability can be achieved by causing the excess steam to serve as the dilution steam 311. Moreover, the combustion gas 105 is agitated and diluted by the flow of the dilution steam 311, which contributes to achieving required service lives of the parts subject to high temperatures.

Additionally, the inflow of a large amount of injection steam 310 through the dilution hole 22 reduces the flow rate of the dilution air 103, while increasing the flow rate of combustion air 104, as compared with the case in which the injection steam has a relatively low flow rate. As a result, the humidity in the combustion air 104 can be prevented from increasing even with an increase in the injection steam amount, so that unstable combustion due to high humidity can be prevented from occurring.

As described above, when the injection steam amount from the injection steam system 84 is small and the velocity of the steam spurted out from the steam injection hole 35 is low, the injection steam 310 is bent by the flow of the compressed air 101 through the air flow path 23 to thereby increase a ratio thereof mixed with the combustion air 104. In contrast, when the injection steam amount from the injection steam system 84 is large and the velocity of the steam spurted out from the steam injection hole 35 is high, the injection steam 310 penetrates the flow of the compressed air 101 to thereby increase a ratio thereof to flow into the dilution hole 22. Thus, the variable heat to power gas turbine 1 can automatically maintain an appropriate amount of humidity in the combustion air 104 even with greatly varying injection steam amounts, so that both NOx reduction and stable combustion can be maintained.

As described above, in the gas turbine combustor and the steam injected gas turbine according to the first embodiment of the present invention, the injected steam (the injection steam 310) is spurted into the flow of the compressed air 101 through the air flow path 23, from the steam injection holes 35 toward the dilution holes 22 facing the respective steam injection holes 35. Thus, the ratio of the steam (the NOx reduction steam 312) to be mixed with the compressed air 101 for use in combustion to the steam (the dilution steam 311) to flow through the dilution holes 22 varies appropriately according to the injection steam amount. Specifically, both the NOx reduction and the stable combustion can be achieved with respect to the varying injection steam amounts without the need to perform complicated control.

In the first embodiment, the steam distribution mechanism that distributes the steam to the steam injection holes 35 includes the steam header 33 disposed inside the combustor casing 12. A space available in the combustor casing 12 can thus be used for promoting circumferentially uniform humidity in the combustor 3.

Moreover, in the first embodiment, the steam header 33 includes the combustor casing 12 and the liner flow sleeve 16. Thus, circumferentially uniform humidity in the combustor 3 can be promoted from a simple configuration.

Second Embodiment

A gas turbine combustor and a steam injected gas turbine according to a second embodiment of the present invention will be described below with reference to FIGS. 8 to 13.

First and second examples of the gas turbine combustor and the steam injected gas turbine according to the second embodiment of the present invention will first be described below with reference to FIGS. 8 and 9.

Figure 8:
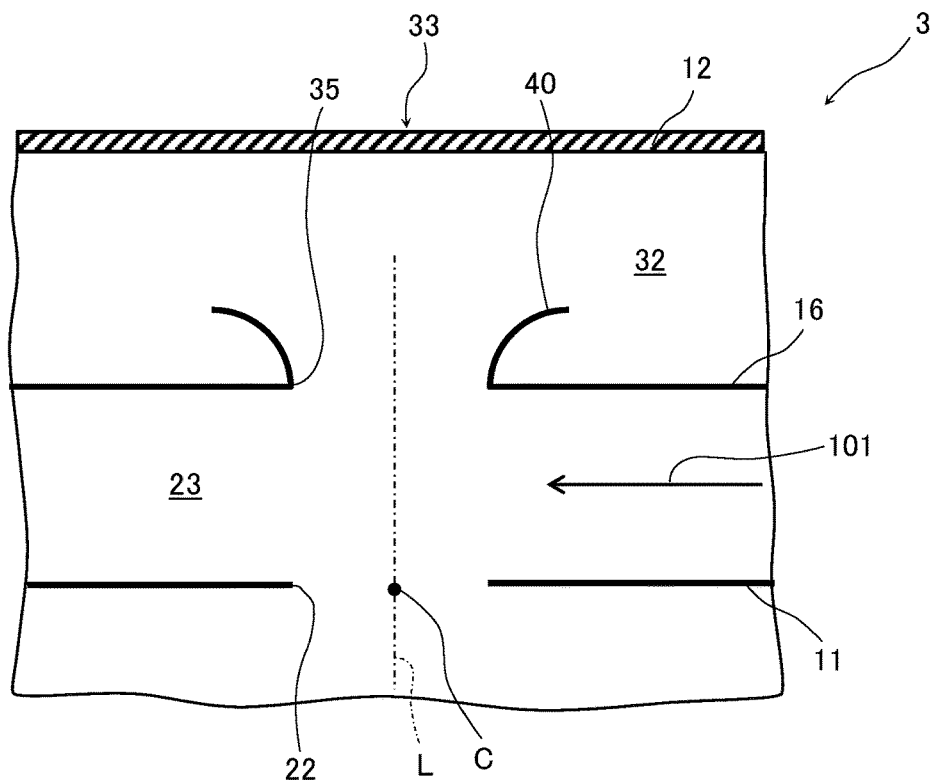
FIG. 8 is a schematic longitudinal cross-sectional view of an example of a steam flow guide that constitutes part of a gas turbine combustor and a steam injected gas turbine according to a second embodiment of the present invention.

FIG. 8 is a schematic longitudinal cross-sectional view of an example of a steam flow guide that constitutes part of the gas turbine combustor and the steam injected gas turbine according to the second embodiment of the present invention. FIG. 9 is a schematic longitudinal cross-sectional view of another example of the steam flow guide that constitutes part of the gas turbine combustor and the steam injected gas turbine according to the second embodiment of the present invention. In FIGS. 8 and 9, like parts are identified by the same reference numerals as those used in FIGS. 1 to 7 and descriptions therefor will be omitted.

The first example of the gas turbine combustor and the steam injected gas turbine according to the second embodiment of the present invention shown in FIG. 8 includes, to add to the elements included in the first embodiment, tubular steam flow guides 40 (only one shown in FIG. 8). The steam flow guides 40 are disposed at the steam injection holes 35 of the liner flow sleeve 16. The steam flow guides 40 guide steam in the annular space 32 of the steam header 33 into the air flow path 23.

More specifically, each of the steam flow guide 40 has a substantially axisymmetric shape and is disposed such that an axis L thereof passes through the dilution hole 22, preferably a center C of the dilution hole 22. In other words, the structure is intended such that the steam spurted out from the steam flow guide 40 flows toward the dilution hole 22 opposed to the steam flow guide 40 so as to be substantially orthogonal to the flow of the compressed air 101 in the air flow path 23. In addition, the steam flow guide 40 is fixed to the steam injection hole 35 such that the whole of the steam flow guide 40 is disposed inside the annular space 32. Moreover, the steam flow guide 40 is, for example, shaped like the mouth of a bell (bell mouth-shaped) having a flow path cross sectional area greater at a steam inlet side (upper side in FIG. 8) than at a steam outlet side (lower side in FIG. 8). This results in reduced resistance to the flow of the injection steam 310 at the inlet of the steam injection hole 35, so that the injection steam 310 can be spurted into the flow of the compressed air 101 with pressure loss smaller than in the first embodiment (see FIGS. 4 and 6).

Figure 9:
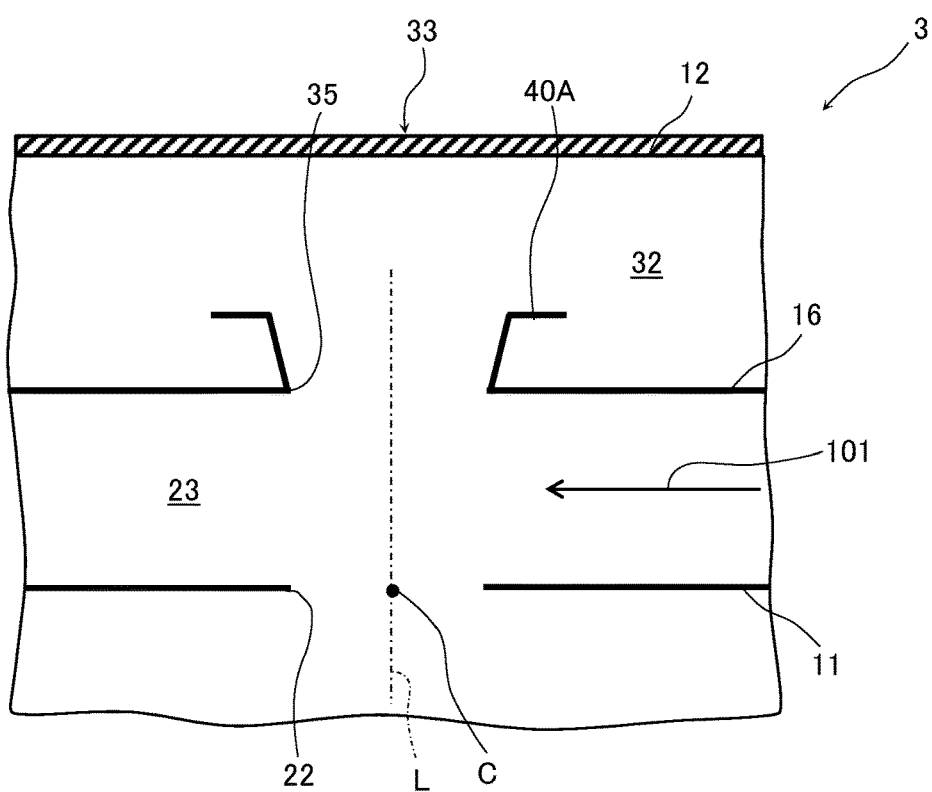
FIG. 9 is a schematic longitudinal cross-sectional view of another example of the steam flow guide that constitutes part of the gas turbine combustor and the steam injected gas turbine according to the second embodiment of the present invention.

Whereas the steam flow guide 40 in the first example of the second embodiment is bell mouth-shaped, a steam flow guide 40A in the second example of the gas turbine combustor and the steam injected gas turbine according to the second embodiment of the present invention shown in FIG. 9 is shaped into a hollow truncated cone. The second example of the second embodiment can achieve an effect similar to the effect achieved by the first example of the second embodiment. Additionally, the steam flow guide 40A having a hollow truncated cone shape can be manufactured more easily than the bell mouth-shaped steam flow guide 40 shown in FIG. 8.

First and second examples of a first modification of steam flow guides in the gas turbine combustor and the steam injected gas turbine according to the second embodiment of the present invention will be described below with reference to FIGS. 10 and 11.

Figure 10:
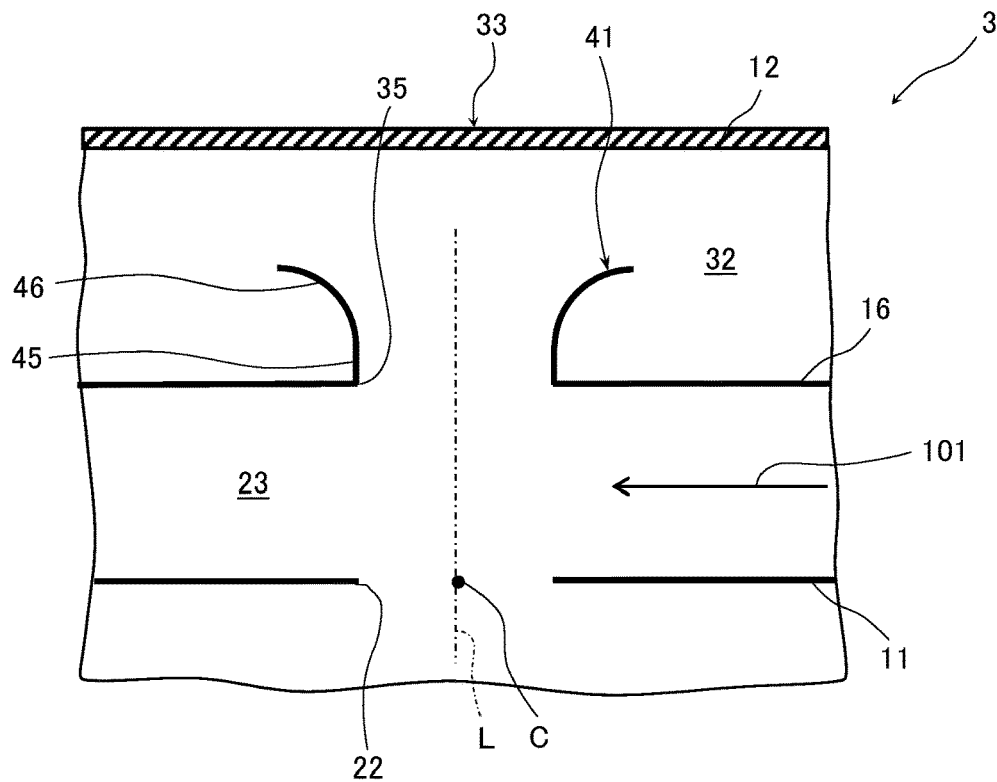
FIG. 10 is a schematic longitudinal cross-sectional view of a first example of a first modification of a steam flow guide that constitutes part of the gas turbine combustor and the steam injected gas turbine according to the second embodiment of the present invention.

FIG. 10 is a schematic longitudinal cross-sectional view of the first example of the first modification of the steam flow guide that constitutes part of the gas turbine combustor and the steam injected gas turbine according to the second embodiment of the present invention. FIG. 11 is a schematic longitudinal cross-sectional view of the second example of the first modification of the steam flow guide that constitutes part of the gas turbine combustor and the steam injected gas turbine according to the second embodiment of the present invention. In FIGS. 10 and 11, like parts are identified by the same reference numerals as those used in FIGS. 1 to 9 and descriptions therefor will be omitted.

Figure 11:
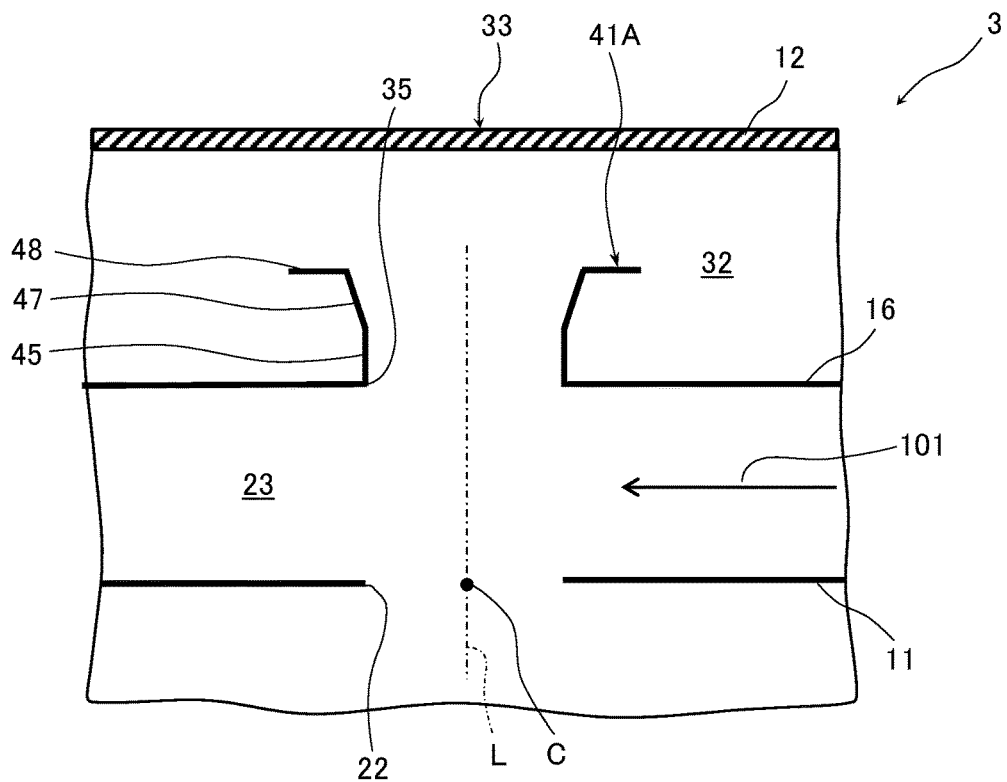
FIG. 11 is a schematic longitudinal cross-sectional view of a second example of the first modification of the steam flow guide that constitutes part of the gas turbine combustor and the steam injected gas turbine according to the second embodiment of the present invention.

Steam flow guides 41 and 41A as the first and second examples of the first modification, shown in FIGS. 10 and 11, in the gas turbine combustor and the steam injected gas turbine according to the second embodiment of the present invention each include a straight pipe section 45. The straight pipe section 45 represents an extension added to a downstream side of the shape of each of the steam flow guides 40 and 40A as the first and second examples in the second embodiment (see FIGS. 8 and 9), That is, the steam flow guides 41 and 41A each include the straight pipe section 45 at an end portion thereof on steam outlet side.

More specifically, the steam flow guide 41 as the first example of the first modification includes the straight pipe section 45 fixed to the steam injection hole 35 and a bell mouth section 46 integrated with the straight pipe section 45. The steam flow guide 41A as the second example of the first modification includes the straight pipe section 45 fixed to the steam injection hole 35, a truncated cone section 47 integrated with the straight pipe section 45, and a flange section 48 that protrudes outwardly from a peripheral edge of an upstream end of the truncated cone section 47.

The steam flow guides 41 and 41A can achieve the effect similar to the effect achieved by the steam flow guides 40 and 40A as the first and second examples in the second embodiment.

In addition, the straight pipe section 45 of each of the steam flow guides 41 and 41A causes the flow of the spurted injection steam 310 to tend to be oriented toward the direction orthogonal to the flow of the compressed air 101, so that a greater amount of steam can be injected into the dilution hole 22. The steam flow guide having the above-described structure is optimum for a steam injection system involving a large amount of steam to be injected.

First and second examples of a second modification of steam flow guides in the gas turbine combustor and the steam injected gas turbine according to the second embodiment of the present invention will be described below with reference to FIGS. 12 and 13.

Figure 12:
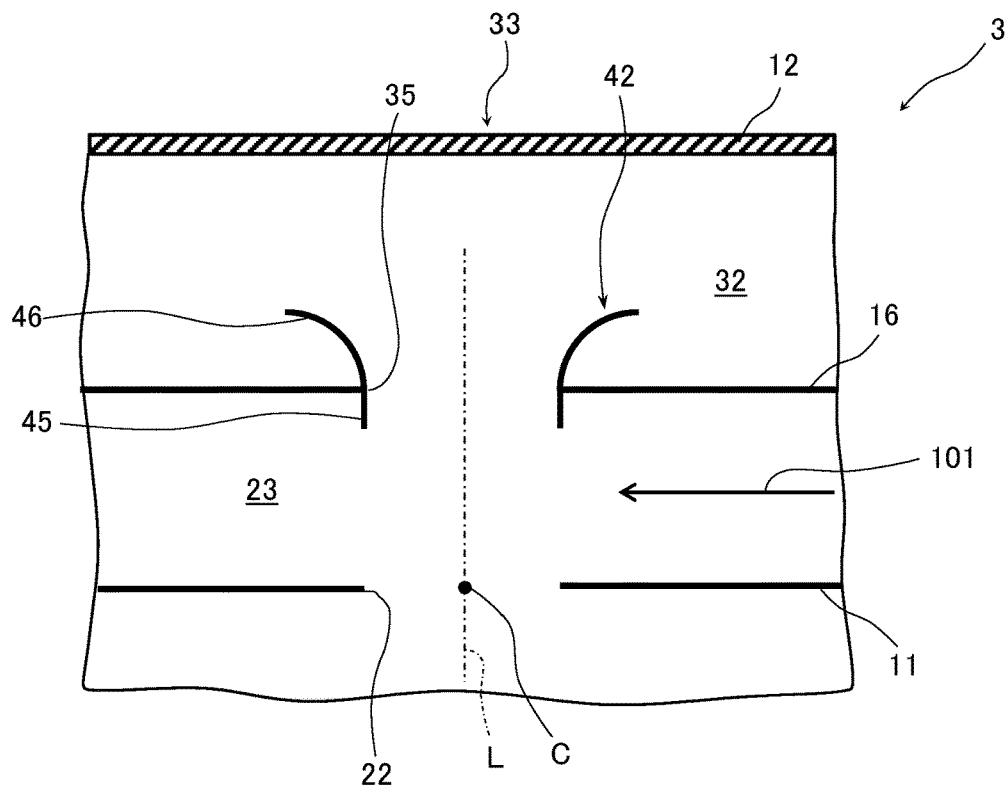
FIG. 12 is a schematic longitudinal cross-sectional view of a first example of a second modification of a steam flow guide that constitutes part of the gas turbine combustor and the steam injected gas turbine according to the second embodiment of the present invention.

FIG. 12 is a schematic longitudinal cross-sectional view of the first example of the second modification of the steam flow guide that constitutes part of the gas turbine combustor and the steam injected gas turbine according to the second embodiment of the present invention. FIG. 13 is a schematic longitudinal cross-sectional view of the second example of the second modification of the steam flow guide that constitutes part of the gas turbine combustor and the steam injected gas turbine according to the second embodiment of the present invention. FIGS. 12 and 13, like parts are identified by the same reference numerals as those used in FIGS. 1 to 11 and descriptions therefor will be omitted.

Figure 13:
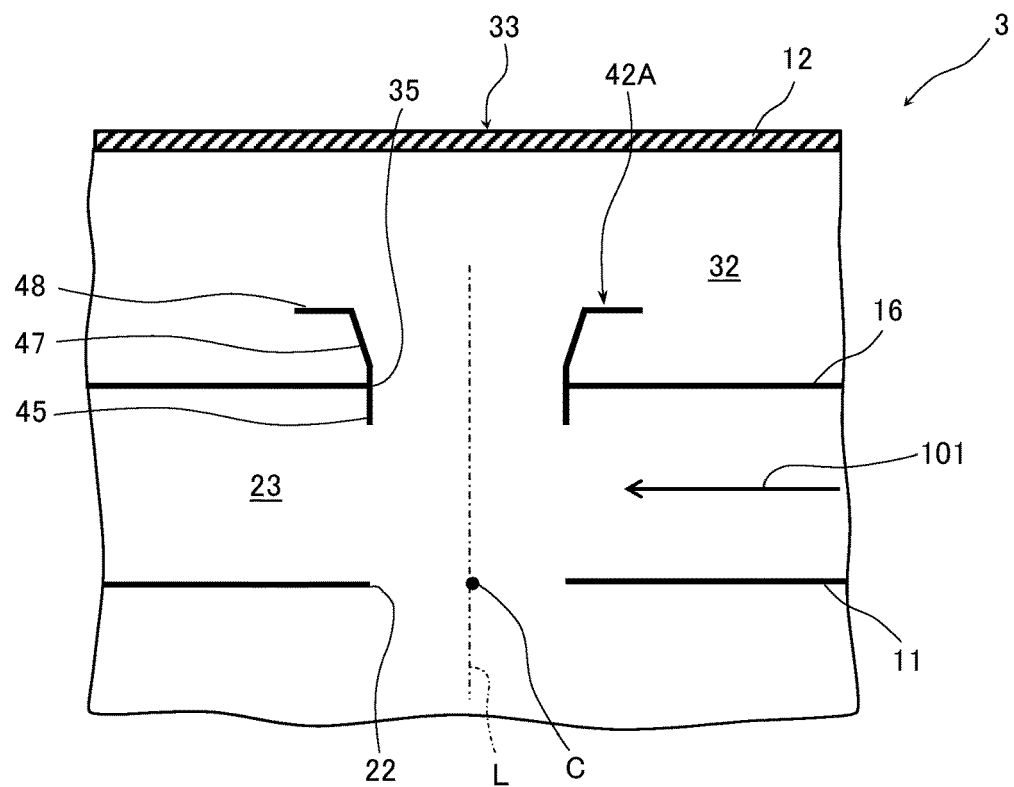
FIG. 13 is a schematic longitudinal cross-sectional view of a second example of the second modification of the steam flow guide that constitutes part of the gas turbine combustor and the steam injected gas turbine according to the second embodiment of the present invention.

Steam flow guides 42 and 42A as the first and second examples of the second modification, shown in FIGS. 12 and 13, in the gas turbine combustor and the steam injected gas turbine according to the second embodiment of the present invention are obtained by modifying the steam flow guides 41 and 41A as the first and second examples of the first modification in the second embodiment such that each end portion of the steam flow guides 41 and 41A on the steam outlet side (a distal end portion of each of the straight pipe sections 45) is disposed on the side of the combustion liner 11 (lower side in FIGS. 12 and 13) relative to the liner flow sleeve 16. Specifically, the steam flow guides 42 and 42A are each fixed to the steam injection hole 35 such that the distal end portion of the straight pipe section 45 is disposed inside the air flow path 23 and a remainder of the steam flow guides 42 and 42A is disposed inside the annular space 32 of the steam header 33.

The foregoing configuration reduces a distance between the steam outlet of the steam flow guides 42 and 42A and the dilution hole 22 as compared with the first and second examples of the first modification, so that a greater amount of injection steam 310 can be injected into the dilution hole 22. The steam flow guide having the above-described structure is optimum for a steam injection system involving a large amount of steam to be injected.

When the steam flow guides 42 and 42A each have a shaft length identical to a shaft length in each of the first and second examples of the first modification, a distance between a steam inlet of each of the steam flow guides 42 and 42A and the combustor casing 12 is greater than in the first and second examples of the first modification. This results in further reduced resistance to the flow of the injection steam 310 at the inlet of the steam injection hole 35. As a result, the injection steam 310 can be spurted into the flow of the compressed air 101 with pressure loss even smaller than in the first and second examples of the first modification.

Additionally, the steam flow guides 42 and 42A, because each including the straight pipe section 45, achieves the effect similar to the effect achieved by the first and second examples of the first modification.

The steam flow guides 42 and 42A each have the steam outlet disposed to be spaced to such an extent away from the dilution hole 22 that the flow of the injection steam 310 spurted out from the steam flow guides 42 and 42A is pulled by the flow of the compressed air 101 existing around the injection steam 310 and mixed as the NOx reduction steam 312 with the combustion air 104 for use in combustion. The effect of NOx reduction by the humidity in the steam can thus be maintained.

The gas turbine combustor and the steam injected gas turbine according to the second embodiment of the present invention described above can achieve the same effects as the effects achieved by the first embodiment described previously.

Additionally, in accordance with the second embodiment, the steam flow guides 40, 40A, 41, 41A, 42, and 42A formed to be substantially symmetrical about their axes L are each disposed so that the axis L passes through the dilution hole 22 opposed to the steam flow guides 40, 40A, 41, 41A, 42, and 42A. This configuration allows the injection steam 310 spurted out from the steam flow guides 40, 40A, 41, 41A, 42, and 42A to be oriented toward the dilution hole 22 more readily than in the first embodiment described previously, so that the spurted injection steam 310 can be reliably directed to be orthogonal to the flow of the compressed air 101.

Moreover, in the second embodiment, the steam flow guides 40, 40A, 41, 41A, 42, and 42A each having a flow path cross-sectional area greater at the steam inlet side than at the steam outlet side are each disposed at the steam injection hole 35. This configuration allows the injection steam 310 to be spurted into the air flow path 23 with pressure loss smaller than in the first embodiment.

Third Embodiment

A gas turbine combustor and a steam injected gas turbine according to a third embodiment of the present invention will be described below with reference to FIGS. 14 and 15.

Figure 14:
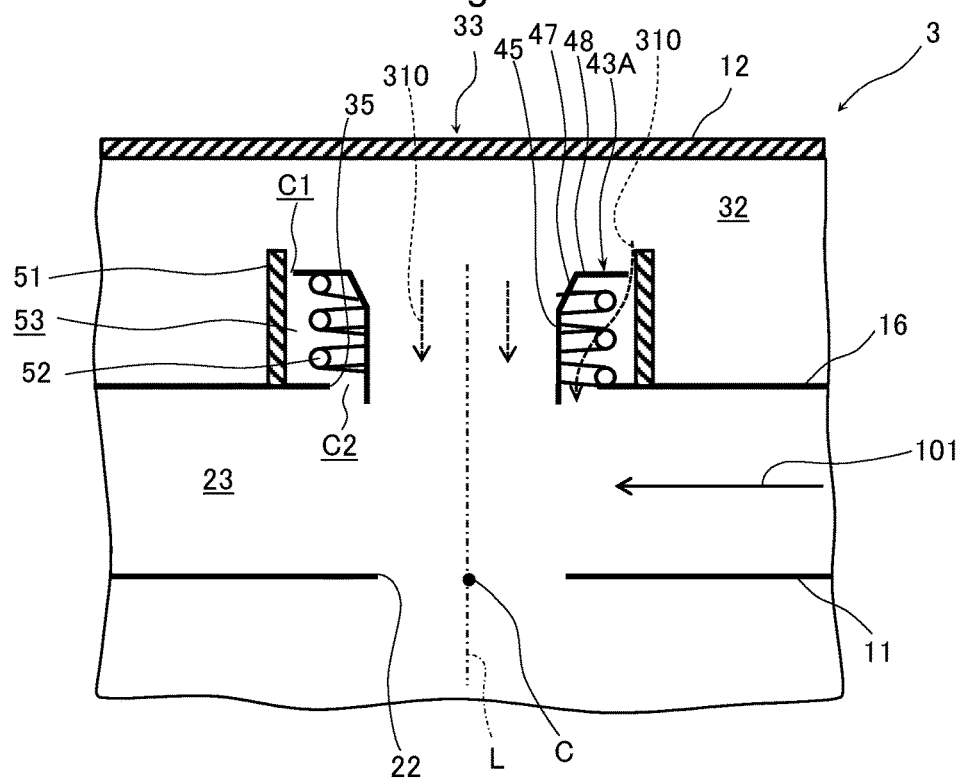
FIG. 14 is a schematic longitudinal cross-sectional view of a steam flow guide that constitutes part of a gas turbine combustor and a steam injected gas turbine according to a third embodiment of the present invention, illustrating a condition of the steam flow guide when the injection steam has a relatively low flow rate.
Figure 15:
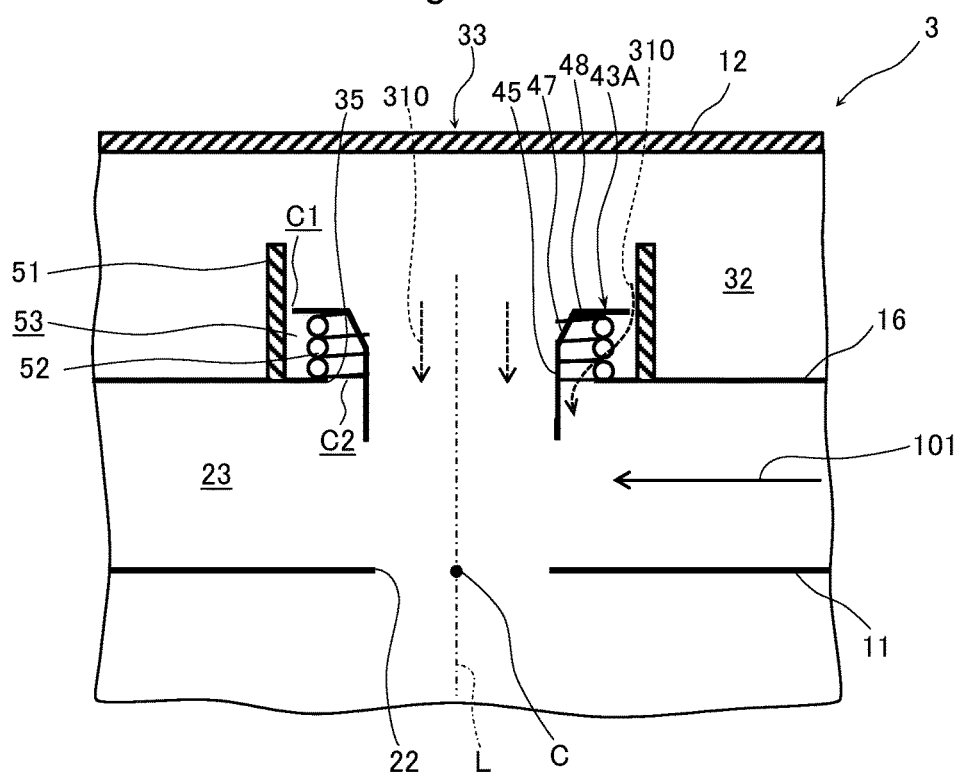
FIG. 15 is a schematic longitudinal cross-sectional views of the steam flow guide that constitutes part of the gas turbine combustor and the steam injected gas turbine according to the third embodiment of the present invention, illustrating a condition of the steam flow guide when the injection steam has a relatively high flow rate.

FIGS. 14 and 15 are schematic longitudinal cross-sectional views of a steam flow guide that constitutes part of the gas turbine combustor and the steam injected gas turbine according to the third embodiment of the present invention. FIG. 14 illustrates a condition of the steam flow guide when the injection steam has a relatively low flow rate. FIG. 15 illustrates a condition of the steam flow guide when the injection steam has a relatively high flow rate. In FIGS. 14 and 15, like parts are identified by the same reference numerals as those used in FIGS. 1 to 13 and descriptions therefor will be omitted.

The steam flow guides 41A and 42A, as the second examples of the first and second modifications in the second embodiment, are each fixed to the steam injection holes 35 of the liner flow sleeve 16 (see FIGS. 11 and 13). In contrast, the gas turbine combustor and the steam injected gas turbine according to the third embodiment of the present invention shown in FIG. 14 includes a steam flow guide 43A disposed to be movable in the direction of an axis L thereof according to the injection steam amount.

Specifically, a flow guide sleeve 51 having a substantially cylindrical shape is fixed to an outer peripheral surface of the liner flow sleeve 16 so as to be coaxial with the steam injection hole 35. The flow guide sleeve 51 houses therein the steam flow guide 43A movably along the direction of the axis L of the steam flow guide the vertical direction in FIG. 14). The steam flow guide 43A includes a straight pipe section 45 (on the steam outlet side) and a flange section 48 (on the steam inlet side). The straight pipe section 45 has an outside diameter smaller than a hole diameter of the steam injection hole 35. The flange section 48 has an outside diameter greater than the hole diameter of the steam injection hole 35. A gap C1 between the flange section 48 (the steam inlet side) of the steam flow guide 43A and the flow guide sleeve 51 is set to have an area that is smaller than an area of a gap C2 between the straight pipe section 45 (the steam outlet side) of the steam flow guide 43A and an opening edge of the steam injection hole 35. The flow guide sleeve 51, the steam flow guide 43A, and the liner flow sleeve 16 define an annular space 53 having the gap C1 and the gap C2. The space 53 inside the flow guide sleeve 51 houses therein a spring 52. The spring 52 has a first end abutting on the flange section 48 and a second end abutting on an outer peripheral surface of the liner flow sleeve 16. That is, the steam flow guide 43A is supported by the liner flow sleeve 16 via the spring 52.

The flow guide sleeve 51 and the spring 52 described above constitute a steam flow guide moving mechanism that causes the steam flow guide 43A to be closer to the dilution hole 22 according as the injection steam amount increases and causes the steam flow guide 43A to be spaced away from the dilution hole 22 according as the injection steam amount decreases.

The following describes, with reference to FIGS. 14 and 15, conditions of the steam flow guide with different injection steam amounts in the gas turbine combustor and the steam injected gas turbine according to the third embodiment of the present invention.

As shown in FIG. 14, a good part of the injection steam 310 in the annular space 32 of the steam header 33 spurts into the flow of the compressed air 101 through the steam flow guide 43A. Meanwhile, a small part of the injection steam 310 spurts into the flow of the compressed air 101 through the gap C1 and the gap C2 in sequence. At this time, pressure in the spare 53 (in which the spring 52 is disposed) defined by the flow guide sleeve 51, the steam flow guide 43A, and the liner flow sleeve 16 is substantially equal to pressure in the air flow path 23 through which the compressed air 101 flows, since the gap C2 is greater than the gap C1.

When the injection steam has a relatively low flow rate, pressure in the annular space 32 of the steam header 33 is higher than the pressure in the space 53 by pressure loss generated when part of the injection steam 310 flows into the space 53 through the narrow gap C1. This pressure difference presses the steam flow guide 43A toward the side of the dilution hole 22 (downward in FIG. 14) and the steam flow guide 43A is maintained at a position where a force resulting from the pressure difference balances an elastic force of the spring 52.

When the injection steam has a relatively high flow rate, the pressure loss of the injection steam 310 that flows through the gap C1 increases by the increase in the injection steam amount. Thus, the pressure in the annular space 32 is higher than when the injection steam has a relatively low flow rate. As a result, as shown in FIG. 15, the force that presses the steam flow guide 43A toward the side of the dilution hole 22 (downward in FIG. 15) is greater than when the injection steam has a relatively low flow rate, so that the steam flow guide 43A is maintained at a position closer to the dilution hole 22 (downward in FIG. 15) than when the injection steam has a relatively low flow rate. This results in a smaller distance between the steam outlet of the steam flow guide 43A and the dilution hole 22, causing a greater amount of steam to flow into the dilution hole 22 than when the injection steam has a relatively low flow rate.

As described above, when the injection steam has a relatively low flow rate, the distance between the outlet of the steam flow guide 43A and the dilution hole 22 is relatively greater than when the injection steam has a relatively high flow rate and the injection steam 310 has a low flow velocity. As a result, a good part of the injection steam 310 is mixed as the NOx reduction steam 312 with the combustion air for use in combustion. The effect of NOx reduction by the humidity in the steam can thus be exhibited.

When the injection steam has a relatively high flow rate, the distance between the outlet of the steam flow guide 43A and the dilution hole 22 is relatively smaller than when the injection steam has a relatively low flow rate and the injection steam 310 has a high flow velocity. Thus, a greater amount of injection steam 310 penetrates the flow of the compressed air 101 and flows into the dilution hole 22 than when the injection steam has a relatively low flow rate, so that an excess injection steam 310 can be used as the dilution steam 311. In other words, combustion stability can be achieved.

Additionally, the third embodiment eliminates the need for complicated control to achieve the foregoing effects by having two separate systems, one for the NOx reduction steam and the other for the dilution steam, and by regulating the steam flow rate using a flow control valve disposed in each of the two systems.

The gas turbine combustor and the steam injected gas turbine according to the third embodiment of the present invention described above have a configuration in which the steam flow guide 43A is movable in the direction to be closer to and spaced away from the dilution hole 22 of the combustion liner 11 according to the varying injection steam amounts. As compared with the second embodiment described previously, in which the steam flow guide is fixed to the steam injection hole 35, the third embodiment can reliably achieve both the NOx reduction and the stable combustion with respect to the varying injection steam amounts.

In addition, the third embodiment incorporates the flow guide sleeve 51 and the spring 52 for moving the steam flow guide 43A according to the injection steam amount. The NOx reduction and the stable combustion can both be achieved with respect to the varying injection steam amounts, not by complicated control, but with the simple configuration.

Miscellaneous Embodiments

The first to third embodiments have been described exemplarily for the combustor 3 in the variable heat to power cogeneration system. The present invention is nonetheless applicable to a gas turbine combustor with variable steam injection amounts in a system other than the variable heat to power cogeneration system.

Additionally, the first embodiment described above has been exemplified by the steam header 33 that includes the combustor casing 12, the liner flow sleeve 16, and the bulkhead 34 as the steam distribution mechanism that distributes steam uniformly in the circumferential direction. A steam manifold 55 may nonetheless be connected to the steam injection holes 35 to constitute the steam distribution mechanism as shown in FIG. 16.

Figure 16:
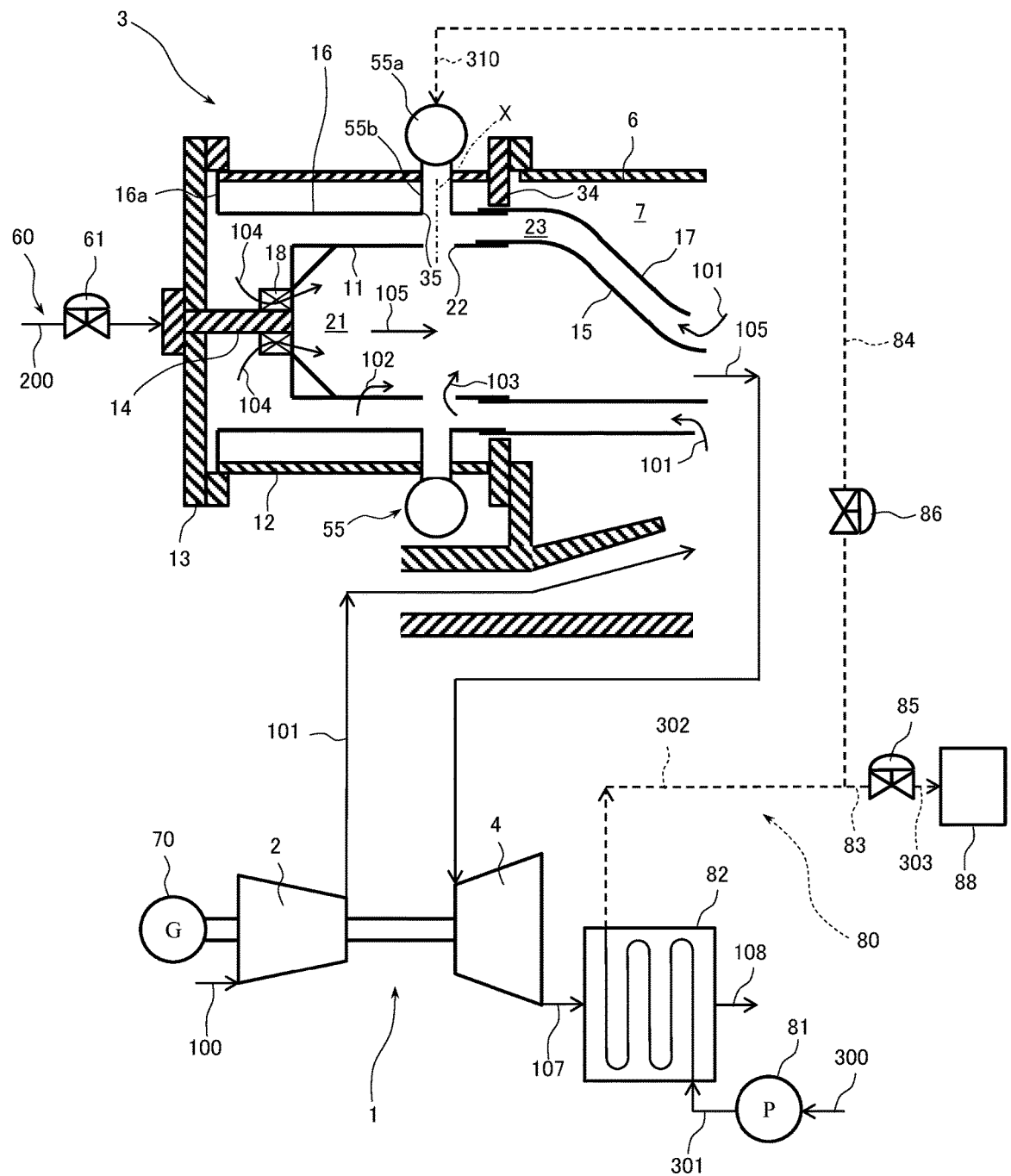
FIG. 16 is a longitudinal cross-sectional view of a gas turbine combustor according to a modification of the first embodiment of the present invention and a system flow diagram of a variable heat to power cogeneration system including the gas turbine combustor.

FIG. 16 is a longitudinal cross-sectional view of a gas turbine combustor according to a modification of the first embodiment of the present invention. FIG. 16 also shows a system flow diagram of a variable heat to power cogeneration system including the gas turbine combustor. In FIG. 15, like parts are identified by the same reference numerals as those used in FIGS. 1 to 15 and descriptions therefor will be omitted.

The steam manifold 55 includes a steam guide pipe 55a and a plurality of branch pipes 55b. The steam guide pipe 55a receives the injection steam 310 injected from the injection steam system 84. The branch pipes 55b branch out from the steam guide pipe 55a to be connected to the respective steam injection holes 35. Each of the branch pipes 55b is disposed so that an axis X thereof passes through the dilution hole 22 opposed to the branch pipe 55b. The flow of the injection steam 310 spurted out from the branch pipe 55b is thus directed toward the dilution hole 22 opposed to the branch pipe 55b and is substantially orthogonal to the direction of the flow of the compressed air 101 in the air flow path 23. The steam manifold 55 can distribute the injection steam 310 from the injection steam system 84 uniformly to each of the steam injection holes 35 disposed circumferentially. The modification of the first embodiment can thus achieve effects similar to the effects achieved by the first embodiment described previously.

Additionally, the third embodiment has been described exemplarily for the steam flow guide 43A that is formed into a truncated cone shape. A bell mouth-shaped steam flow guide may nonetheless be used.

It should be noted that the present invention is not limited to the above-described first to third embodiments and may include various modifications. For example, the entire detailed configuration of the embodiments described above for ease of understanding of the present invention is not always necessary to embody the present invention. Part of the configuration of one embodiment may be replaced with the configuration of another embodiment, or the configuration of one embodiment may be combined with the configuration of another embodiment. The configuration of each embodiment may additionally include another configuration, or part of the configuration may be deleted or replaced with another.

What is claimed is:

1. A gas turbine combustor comprising:
a tubular combustion liner that defines therein a combustion chamber, the tubular combustion liner having dilution holes disposed at circumferentially spaced intervals at a section downstream in a direction of flow of combustion gas;
a combustor casing that encloses the tubular combustion liner;
a liner flow sleeve disposed between the tubular combustion liner and the combustor casing, to define with the tubular combustion liner an annular air flow path through which compressed air from a compressor flows, the liner flow sleeve having steam injection holes; and
a steam distribution mechanism disposed on an outer peripheral side of the liner flow sleeve, the steam distribution mechanism being configured to receive steam and to distribute the steam to the steam injection holes, wherein
at least some of the steam injection holes are disposed so as to face at least some of the dilution holes,
the at least some of the steam injection holes are each formed so as to spurt the steam toward the at least some of the dilution holes, and
the steam distribution mechanism includes:
a steam injection port into which the steam is injected, the steam injection port being disposed at the combustor casing; and
a steam header having, on an inner peripheral side of the combustor casing, an annular space that receives the steam from the steam injection port, the steam header distributing the steam from the steam injection port to the steam injection holes.

2. The gas turbine combustor according to claim 1, wherein
the steam header includes:
the combustor casing;
the liner flow sleeve that has the steam injection holes; and
a bulkhead that protrudes from an end portion of the combustor casing downstream in the direction of flow of the combustion gas toward a side of the liner flow sleeve, the bulkhead defining the annular space with the combustor casing and the liner flow sleeve.

3. The gas turbine combustor according to claim 2, further comprising:
a steam flow guide disposed at one of the at least some of the steam injection holes, the steam flow guide guiding the steam in the steam header into the annular air flow path, the steam flow guide being axially symmetrical and having an axis that passes through the dilution hole, the steam flow guide having a flow path cross-sectional area greater on a steam inlet side than on a steam outlet side.

4. The gas turbine combustor according to claim 3, wherein an end portion of the steam flow guide on the steam outlet side is a straight pipe section.

5. The gas turbine combustor according to claim 3, wherein the steam flow guide is fixed to the steam injection hole such that the whole of the steam flow guide is disposed inside the steam header.

6. The gas turbine combustor according to claim 3, wherein the steam flow guide is fixed to the steam injection hole such that a distal end portion of the steam flow guide on the steam outlet side is disposed inside the annular air flow path and a remainder of the steam flow guide is disposed inside the steam header.

7. The gas turbine combustor according to claim 3, wherein the steam flow guide is disposed so as to be movable along a direction of the axis thereof, the gas turbine combustor further comprising:
a steam flow guide moving mechanism that causes the steam flow guide to be closer to the dilution hole according as an injection steam amount increases and causes the steam flow guide to be spaced away from the dilution hole according as the injection steam amount decreases.

8. The gas turbine combustor according to claim 7, wherein
the steam flow guide moving mechanism includes:
a flow guide sleeve fixed on an outer peripheral surface of the liner flow sleeve, the flow guide sleeve housing the steam flow guide movably; and
a spring disposed inside the flow guide sleeve, the spring having a first end abutting on the steam flow guide and a second end abutting on the outer peripheral surface of the liner flow sleeve, and
a gap between the steam flow guide on the steam inlet side and the flow guide sleeve is smaller than a gap between the steam flow guide on the steam outlet side and an opening edge of the steam injection hole.

9. A steam injected gas turbine comprising the gas turbine combustor according to claim 1.

* * * * *